(12) United States Patent
Crawford, Jr. et al.

(10) Patent No.: US 8,392,245 B1
(45) Date of Patent: Mar. 5, 2013

(54) SYSTEM AND METHOD FOR RENDERING CONTENT ACCORDING TO AVAILABILITY DATA FOR ONE OR MORE ITEMS

(75) Inventors: James M. Crawford, Jr., Flower Mound, TX (US); LaMott G. Oren, Dallas, TX (US); Michael G. Pailas, Randolph, NJ (US); Balakrishnan Vinod, Grapevine, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 4169 days.

(21) Appl. No.: 09/675,415

(22) Filed: Sep. 29, 2000

(51) Int. Cl.
*G06Q 30/00* (2012.01)

(52) U.S. Cl. .................. 705/14.16; 705/14.55; 705/26.7

(58) Field of Classification Search .................... 705/10, 705/22, 14, 26, 28, 14.16, 14.55, 26.7
See application file for complete search history.

(56) References Cited

U.S. PATENT DOCUMENTS

| | | | | |
|---|---|---|---|---|
| 4,737,910 A | 4/1988 | Kimbrow | ...................... | 364/403 |
| 5,712,989 A | 1/1998 | Johnson et al. | ............... | 395/228 |
| 5,774,868 A * | 6/1998 | Cragun et al. | .................. | 705/10 |
| 5,809,144 A | 9/1998 | Sirbu et al. | ...................... | 380/25 |
| 5,979,757 A | 11/1999 | Tracy et al. | .................... | 235/383 |
| 5,999,908 A | 12/1999 | Abelow | ............................ | 705/1 |
| 6,012,041 A | 1/2000 | Brewer et al. | .................... | 705/28 |
| 6,052,710 A | 4/2000 | Saliba et al. | | |
| 6,085,170 A | 7/2000 | Tsukuda | .......................... | 705/26 |
| 6,266,649 B1 * | 7/2001 | Linden et al. | .................... | 705/26 |

OTHER PUBLICATIONS

PCT Notification of Transmittal of the International Search Report or the Declaration, 4 pages, May 12, 2001.
Ashish, Naveen; KNOBLOCK: Craig: Semi-automatic Wrapper Generation for Internet Information Sources. Proc. of the 2nd IFCIS Int. Conf. on Cooperative Information Systems, Kiawah Island, S.C., USA, 1997. pp. 160-169.

* cited by examiner

*Primary Examiner* — Raquel Alvarez
(74) *Attorney, Agent, or Firm* — Jackson White, PC; Steven J. Laureanti

(57) ABSTRACT

A system for rendering content according to availability data for at least one item includes a server to receive a content request from a user and, in response, to retrieve requested content. A rendering engine coupled to the server identifies at least one rule associated with the content and concerning the item. A rules engine coupled to the rendering engine generates at least one availability request corresponding to the rule and concerning the item. The rules engine receives the availability data for the item, retrieves additional content according to the availability data for the item, and communicates the additional content to the rendering engine for incorporation into the requested content. The rendering engine renders the requested content, including the additional content concerning the item. The server communicates the rendered content to the user to satisfy the content request.

43 Claims, 2 Drawing Sheets

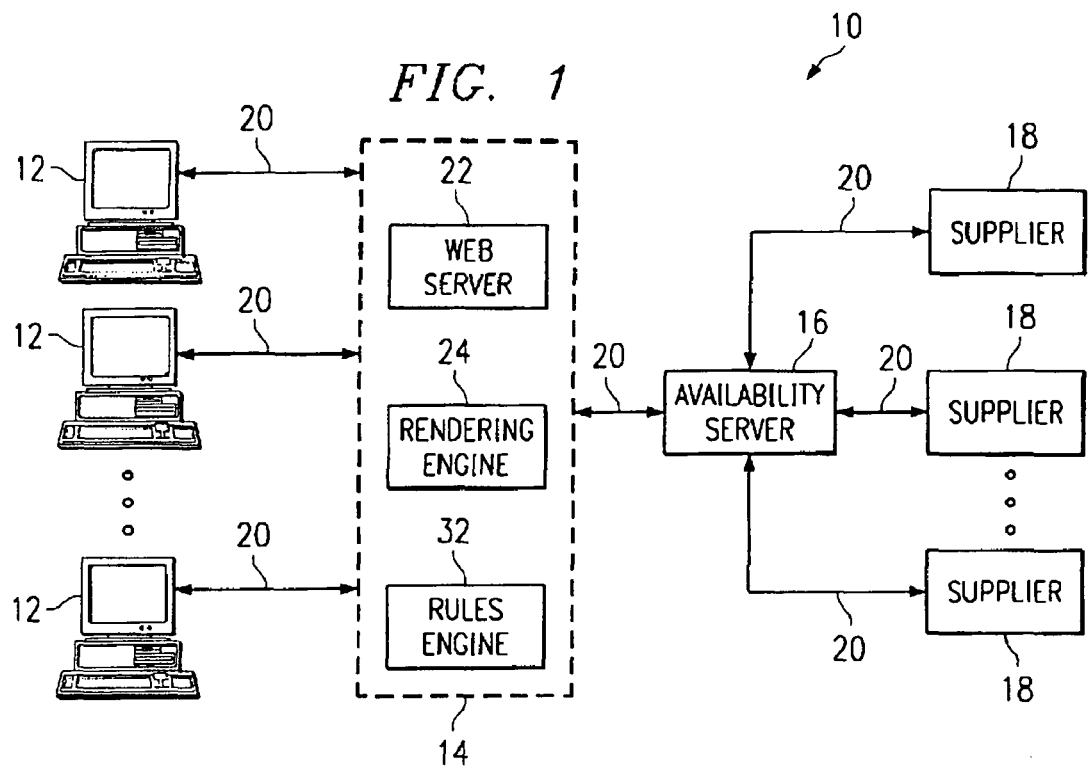
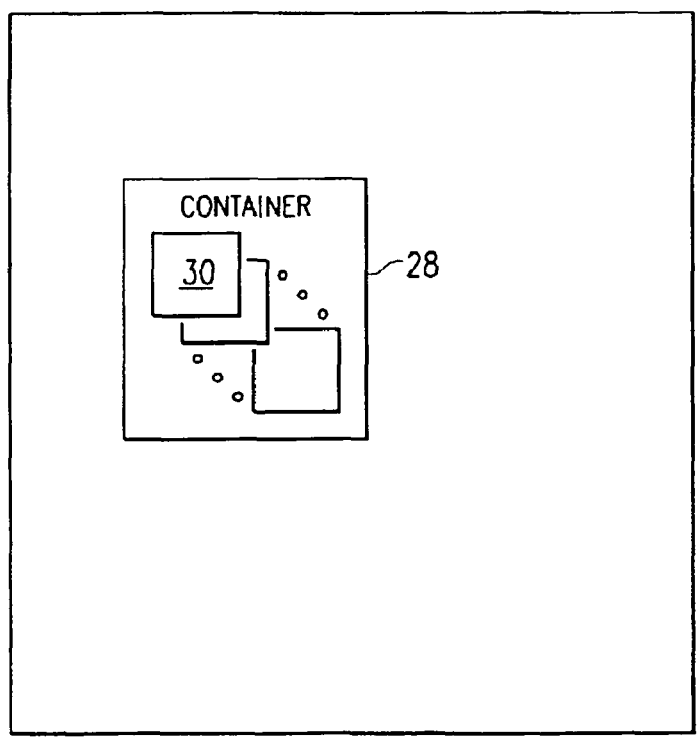

SYSTEM AND METHOD FOR RENDERING CONTENT ACCORDING TO AVAILABILITY DATA FOR ONE OR MORE ITEMS

TECHNICAL FIELD OF THE INVENTION

This invention relates generally to content rendering, and more particularly to a system and method for rendering content according to availability data for one or more items.

BACKGROUND OF THE INVENTION

Web page content is commonly personalized for particular users based on one or more demographic, usage, or other characteristics of the particular users. For example, if a young male consumer requests a web page associated with an Internet website, and a determination of these characteristics (young and male) can be made at the website, the requested page might be rendered at the website to include an advertisement for a red sportscar based on these characteristics. Such personalization allows advertisements to be presented to their target audiences—those most likely to purchase products, services, or other items in response to the advertisements—to increase sales of these items. When a consumer responds favorably to such a personalized advertisement, attempting to buy the item to which the advertisement is directed, but the item is not in stock, cannot be delivered within an acceptable time, or is otherwise unavailable, the consumer may often become disappointed, frustrated, or even angry with the seller. This may actually result in lower sales for the seller, as such consumers attempt to purchase the requested item, and perhaps future items, from other on-line sellers or decrease their on-line shopping in general. As a result of these or other disadvantages, previous techniques for rendering content have been inadequate for the needs of many sellers.

SUMMARY OF THE INVENTION

According to the present invention, problems and disadvantages associated with previous techniques for rendering content are substantially reduced or eliminated.

According to one embodiment of the present invention, a system for rendering content according to availability data for at least one item includes a server to receive a content request from a user and, in response, to retrieve requested content. A rendering engine coupled to the server identifies at least one rule associated with the content and concerning the item. A rules engine coupled to the rendering engine generates at least one availability request corresponding to the rule and concerning the item. The rules engine receives availability data for the item, retrieves additional content according to the availability data for the item, the additional content being selected from among one or more stored content elements that concern the item, and communicates the additional content concerning the item to the rendering engine for incorporation in the requested content. The rendering engine renders the requested content, including the additional content concerning the item. The server then communicates the rendered content to the user to satisfy the content request.

The present invention provides a number of technical advantages over previous techniques. The rendering of web-based or other content concerning a product, service, or other item based on availability data for the item obtained from one or more suppliers allows sellers to make more accurate commitments, dynamically adjust advertisements and other promotions, dynamically adjust pricing policies, and otherwise respond more effectively to the changing commercial landscape in which they operate. Customers that receive accurate commitments, which can be fulfilled in a timely manner as promised, may experience less disappointment, frustration, and anger with the seller. Sellers are able not only to personalize their marketing for particular types of customers, but may selectively market items that may be in excess in inventory, have higher profit margins, or are otherwise more desirable from the perspective of the sellers. As the availability data for items changes at one or more suppliers, sellers may be notified of the changes and content rendered to reflect these changes, providing these sellers with an edge over the competition. A seller may more effectively use available space, within a web page for example, by replacing content concerning an unavailable or otherwise less desirable item (from the seller's perspective) with content concerning an available or otherwise more desirable item. As communications channels continue to expand in number and type, the present invention may be increasingly effective in improving the profitability and overall success of sellers who market using these channels, based on an improved appreciation of fluctuating supply chain events and opportunities.

Systems and methods incorporating one or more of these or other advantages are well suited for modern commercial environments such as those associated with Internet websites or electronic marketplaces. Other technical advantages are readily apparent to those skilled in the art from the following figures, descriptions, and claims.

BRIEF DESCRIPTION OF THE DRAWINGS

To provide a more complete understanding of the present invention and features and advantages thereof, reference is made to the following description in conjunction with the accompanying drawings, in which:

FIG. 1 illustrates an exemplary system for rendering content according to availability data for one or more items;

FIG. 2 illustrates an exemplary web page including a container for one or more rules.

DETAILED DESCRIPTION OF THE INVENTION

Figure 3:
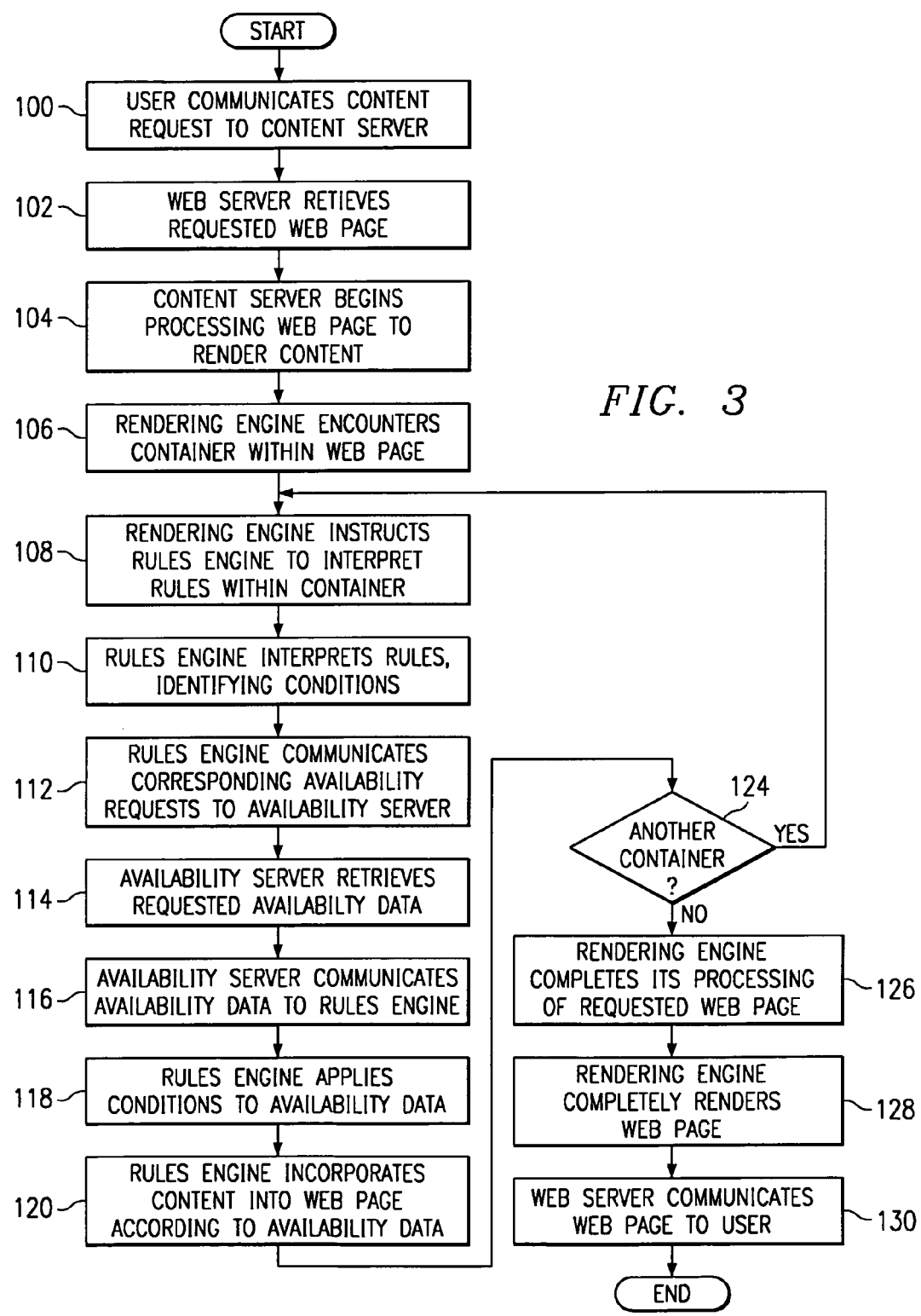
FIG. 3 illustrates an exemplary method of rendering content according to availability data for one or more items.

FIG. 1 illustrates an exemplary system 10 for rendering content according to availability data for one or more items. System 10 includes one or more users 12, a content server 14, an availability server 16, and one or more suppliers 18. In general, content server 14 receives a content request from user 12, which may be a request for a particular web page of a website associated with the content server 14. In response, content server 14 retrieves the requested web page and determines that the web page includes an advertisement or other content concerning a product, service, or other item. Content server 14 accesses availability server 16 to obtain availability data for the item, which may be obtained from one or more suppliers 18 of the item, and renders content for the web page according to the availability data. Content server 14 communicates the rendered web page to the user 12. Rendering content concerning an item according to availability data for the item may greatly decrease the likelihood that the item will be unavailable for purchase, timely delivery, or otherwise in response to user 12 receiving the requested content. References herein to rendering content are meant to encompass generation, creation, formatting, or any other suitable operations relating to content to facilitate its communication and display to user 12.

Content server 14 may generate, render, and communicate content to users 12 in the form of Hypertext Markup Language (HTML) pages, Extensible Markup Language (XML) pages, or in any other scripted page or other appropriate format. Although web pages are primarily described, the present invention contemplates any appropriate page, file, document, or other data representation. Therefore, where appropriate, references to a web page or web pages are intended to encompass all such representations and do not limit the scope of the invention to any particular representation. Furthermore, reference to a web page is intended, where appropriate, to include the displayed image of the web page (in a browser window of user 12 for example) in addition to underlying HTML or other code used in generating the displayed image. In one embodiment, users 12 may communicate Hypertext Transfer Protocol (HTTP) requests to the content server 14 to receive web pages. Each HTTP request identifies a stored web page using a Uniform Resource Locator (URL) or other address within the HTTP request. In response to user 12 connecting to content server 14 using the HTTP request, content server 14 retrieves the requested web page using the URL, renders the web page for display as described more fully below, and communicates the web page to user 12 where an associated web browser displays the web page for viewing. The request for, retrieval of, rendering of, and communication of web pages in Internet and other web-based environments is well known to those skilled in the art.

Users 12 may be any suitable entities that access content associated with content server 14, either autonomously or according to input from associated persons. Content server 14 may be associated with one or more websites, electronic business-to-business ("B2B") marketplaces that facilitate B2B transactions, or any other system operating to provide content to one or more users 12. Availability server 16 may be any appropriate system, integral to or separate from content server 14, that obtains availability data from one or more suppliers 18 and provides this availability data to content server 14 for the purposes described above. For example, the fulfillment server described in copending U.S. application Ser. No. 09/398,171, which is hereby incorporated by reference, may serve as availability server 16. Suppliers 18 may be any suitable entities capable of providing availability data concerning one or more products, services, or other items to availability server 16. Users 12, content server 14, availability server 16, and suppliers 18 may be coupled to one another using links 20 that each include one or more local area networks (LANs), metropolitan area networks (MANs), wide area networks (WANs), a portion of a global computer network such as the Internet, or any other suitable wireline, wireless, or other links.

In one embodiment, availability data obtained from suppliers 18 may include any suitable information relating to an item, such as inventory data (e.g., the item is in excess or in short supply), delivery data (e.g., the item cannot be delivered until a certain date), pricing data (e.g., the current price of the item), or any other suitable availability data. Availability data for an item may vary, in whole or in part, between suppliers 18. For example, a first supplier 18 may have twenty units of the item in inventory, priced at $100 per item, with delivery within two days of order. A second supplier 18 may have one hundred units of the item in inventory, priced at $80 per item, with delivery within one week of order. If content server 14 determines that the availability data from the second supplier 18 satisfies the needs of an associated seller, the content server 14 may render content reflecting a price of $80 per item and delivery within one week of order. The seller can reasonably expect to be able to fulfill these commitments. If neither of these suppliers had any units of the item in inventory, or could not procure a sufficient number of units within a certain time, content server 14 might instead render content for an alternative item for which availability data was satisfactory. As a result, the seller is better able to avoid promoting or making commitments that it cannot fulfill or are less desirable than other commitments.

Although availability data is described primarily as being obtained from one or more suppliers 18, the present invention contemplates availability data from suppliers 18 being stored in association with availability server 16, such that availability server 16 need not retrieve availability data from suppliers 18 each time the availability server 16 receives an availability request from content server 14. Availability data at availability server 16 may be refreshed or otherwise updated periodically or in response to specific events, as appropriate. Moreover, although availability data is described primarily as being that of one or more suppliers 18, the present invention contemplates availability data being that of a seller associated with content server 14 and not directly reflecting availability data of suppliers 18. Availability data may further include an appropriate combination of seller availability data and supplier availability data.

Content server 14 may request availability data from availability server 16 for a variety of purposes. For example, before rendering a web page for communication to a user 12, content server 14 may request availability data in order to determine whether to incorporate a particular advertisement within the web page. If the availability data for a product, service, or other item to which the advertisement relates does not satisfy one or more criteria, then content server 14 may replace the first advertisement with a second advertisement for an alternative item or totally withhold advertisements. Availability data may be requested in connection with various other promotional activities, such as coupons, rebates, giveaways, samples, frequent shopper programs, or other price related promotions. If availability data for the item to which the promotion applies does not satisfy one or more criteria, content server 14 may replace the promotion with another, modify the promotion in some suitable manner, or remove the promotion entirely when rendering the web page. Furthermore, content server 14 may request availability data in connection with recommendations for an item, as is described more fully below. The present invention contemplates content server 14 using availability data to render web pages incorporating any appropriate content concerning an item.

Content server 14 may incorporate one or more product recommendations in a web page being rendered based on an indication that user 12 has expressed interest in a trigger product or has otherwise exhibited trigger behavior in interacting with content server 14. Expressions of interest in the trigger product might include selecting one or more hypertext or other links associated with the trigger product within a previous web page (for example, to view product details), placing the trigger product in a shopping cart, attempting to purchase the trigger product, purchasing the trigger product, or any other suitable trigger behavior. A cross-sell recommendation is a recommendation for one or more products that are complementary or otherwise related to a trigger product. For example, in response to user 12 purchasing a wireless telephone, content server 14 might render a web page confirming the purchase that includes a recommendation for a hands free unit for the telephone. An up-sell recommendation is a recommendation for one or more products that may replace a trigger product. This may allow the seller to promote an alternative product for which there is excess inventory, a higher price, a higher profit margin, or any other advantage relative to the trigger product. A re-sell recommendation is a recommendation to again purchase a trigger product, preferably communicated to user 12 an appropriate time after the previous purchase of the trigger product. For example, it may be desirable to communicate a web page incorporating a re-sell recommendation for printer paper to user 12 one month after user 12 previously purchased printer paper, and every month thereafter, until the user 12 again purchases printer paper.

A base product recommendation is a recommendation for a product, service, or other item that is not made according to the behavior of user 12 with respect to a trigger product or otherwise, but is made according to one or more other characteristics of the user 12. For example, a base product recommendation may be made based on one or more demographic, "firmographic" (where user 12 represents a business), or other user characteristics. Similarly, a base product recommendation may be made based upon previous purchasing behavior, clickstream behavior, expressed interests, or any other information relating to user 12. The present invention contemplates incorporating these or any other suitable recommendations, singly or in any appropriate combination, into web pages or other content communicated to users 12. Although recommendations are primarily described, the content server 14 may analogously incorporate advertisements, promotions, or any other suitable targeted content in response to behavior of users 12 with respect to trigger products, other behavior of users 12, or any other information associated with users 12, according to particular needs.

Item recommendations may be sorted based on availability, profitability, or any other suitable information. For example, empirical evidence indicates that customers in web-based environments usually select the first or second recommendation within a list of recommendations. The third and later recommendations are often ignored. Thus, it may be desirable to sort multiple product recommendations within the rendered content such that the recommendations deemed most beneficial to the seller are presented at or near the top of the list or, where only a limited number of recommendations may be presented a time, are presented instead of less beneficial recommendations. Customer profile or other information may be weighed in sorting recommendations. For example, if only one recommendation may be presented to a customer, it is desirable to identify and present the recommendation that is most likely to result in a satisfactory sale based on characteristics of the customer, in addition to availability, profitability, or any other information. The present invention contemplates sorting among item recommendations for presentation to users according to any information bearing on the desirability of the recommendations from the perspective of sellers of the items.

Analogous capabilities may be provided with respect to dynamic promotional, auction, or other pricing. For example, to render content including pricing information for a product, service, or other item, the content server 14 may request availability data from availability server 16 indicating the prices for the item from one or more suppliers 18. Content server 14 may then render content to include the lowest of these prices, in accordance with a suitable promising policy, to improve the likelihood that the user 12 will purchase the item. As another example, the content server 14 may render pricing content according to availability of an item, perhaps incorporating content reflecting a lower price if the item is in excess but a higher price if the item is in relatively short supply. In the context of an electronic marketplace, auction, or other environment in which pricing for an item may change dynamically according to various activities, the content server 14 may use availability data that includes pricing information to render pricing content. As an example, if pricing information returned from availability server 16 indicates that the price being offered by a seller within an electronic marketplace is higher than the price being offered by other competing sellers, then content server 14 might render alternative content reflecting a lower price to improve the likelihood of success for the seller. The present invention contemplates rendering content based on dynamic pricing information for any suitable purpose.

When a product to which a web page or other content relates includes multiple components, then the content server 14 may request availability data for one or more components before rendering the content. As an example, if the web page will include content constituting a promise to deliver a personal computer within a specified time, obtaining availability data for the associated hard disk, memory, or other components may allow the content server 14 to provide a more accurate commitment, which has a higher likelihood of being fulfilled in a timely manner. This may help the seller avoid disappointing, frustrating, or angering users 12. Suppliers 18 may be selected for the components individually based on which supplier 18 will promise the most units, the fastest delivery, the most favorable pricing, or another advantage with respect to each component. As a result of these or analogous availability requests, content server 14 is able to render content that more accurately reflects the availability, pricing, and other information relating to items and which may more likely result in sales of the items to one or more users 12.

In one embodiment, availability server 16 may communicate availability data to content server 14 in response to changes in availability data for an item, which might prompt the content server 14 to render alternative content, either autonomously or in response to input from associated personnel. As an example, as inventory for an item decreases, it may be desirable for a seller of the item to increase the price of the item, as reflected in content rendered by rendering engine 24, to increase its profit margin with respect to the item. Similarly, as the price of an item or one or more of its components decreases at one or more suppliers 18, it may be desirable for the seller to decrease its price, as reflected in content rendered by rendering engine 24, accordingly to increase sales. Availability server 16 may retrieve and communicate availability data to content server 14 in substantially real time as availability data changes, allowing content server 14 to modify its rendering of content accordingly. Alerts that reflect such changes may be sent to personnel associated with the content server 14, from availability server 16, content server 14, or both to allow the personnel to adjust pricing, promotional, or other activities accordingly. The present invention contemplates communicating information reflecting any appropriate change in availability data.

In one embodiment, content server 14 includes a web server 22 that processes a request for a web page from a user 12, identifies the web page according to its URL or otherwise, and instructs a rendering engine 24 to retrieve the web page and render it for communication to user 12. As illustrated in FIG. 2, a web page 26 may include one or more containers 28 each containing one or more rules 30 that specify the availability data to be retrieved from availability server 16 and the conditions to be applied to that retrieved availability data to determine the rendered content of the web page 26. For example, where web page 26 contains HTML, the HTML corresponding to container 28 may be determined according to rules 30 of container 28, while the HTML for the other portions of web page 26 may be static or otherwise unaffected by the interpretation of these rules 30. Referring again to FIG.

1, if the requested web page 26 includes a container 28 having one or more rules 30, then the rendering engine 24 instructs a rules engine 32 to interpret rules 30 so that the appropriate content may be incorporated into web page 26 to replace container 28. In response, rules engine 32 interprets rules 30, communicates one or more availability requests to the availability server 16 to obtain availability data used in applying the rules 30, applies rules 30, and retrieves HTML or other suitable content for incorporation in web page 26 based on the application of the rules 30. Rendering engine 24 continues processing web page 26 and, assuming all the containers 28 and associated rules 30 have been appropriately processed, completes the rendering of the web page 26. Finally, web server 22 communicates the rendered web page 26 incorporating targeted content to the user 12.

Conditions within rules 30 specify comparisons between data elements and pre-defined values. Appropriate conditions may include, without limitation: (1) a data view condition for comparing one or more data values (e.g., the age of user 12) with one or more pre-defined values (e.g., twenty-five); (2) a session view condition for comparing one or more session values relating to the interaction of user 12 with content server 14 during the current session (e.g., the number of items the user 12 has already placed in a shopping cart) with one or more pre-defined values (e.g., zero); (3) a system condition for comparing one or more system variables (e.g., the current time) with one or more pre-defined values (e.g., 1430); (4) a rule condition for invoking another rule 30; and (5) a function call condition for calling a JAVA function (static JAVA method) or another suitable function, program, module, application, or other software component. Rule 30 may have one or more conditions of these or other suitable types.

In addition to constants as in several of the above examples, pre-defined values within rules 30 may be JAVA or other suitable function calls. For example only and not by way of limitation, a system condition within rule 30 may incorporate a function call using the following syntax:

system_variable=<function name>
    cond_oper=call
    cond_value=<function parameter string>

Any suitable function may be called in this manner. Furthermore, parameters for the called function may include one or more other functions to be called. One or more overloaded functions may be supported. In one embodiment, if parameters for a called function include a RuleContext parameter not included in the parameter string, then the RuleContext at the time the associated rule 30 is evaluated is passed into the function. This feature may be used, for example, to change a user profile for user 12 or for any other suitable purpose. As this example indicates, the functions called from within rules 30 may have side-effects, according to particular needs.

As an example, the following function relating to product availability might be called from within rule 30 according to one of its conditions:

Boolean available (RuleContext context,
    Integer item_group,
    String item,
    Integer quantity,
    Integer lead_time)

This "available" function returns "true" if a specified quantity of a specified item in a specified item group can be delivered within a specified lead time (measured in days in this example). So, using the exemplary syntax set forth above, the following condition might return "true" if "2" units of item "34567" within item group "8" can be delivered within "9" days:

system_variable=available
    cond_oper=call
    cond_value=8, 34567, 2, 9

Although JAVA function calls are primarily described, any appropriate trigger may be used to prompt rules engine 26 to dynamically query availability server 26 for availability data, dynamically query availability server 26 or another suitable component for information enabling content server 14 to provide shipping recommendations to user 12, or dynamically query another suitable information source for any other appropriate purpose according to particular needs. Since functions can call other functions to obtain parameters, rules engine 26 may initiate these queries using parameters obtained from any information source accessible to content server 14.

In one embodiment, the rules engine 26 may be optimized such that it batches multiple availability requests for communication to availability server 16 to reduce the associated communication overhead, which may be particularly desirable when content server 14 and availability server 16 operate on different computer systems. In a more particular embodiment, the "available" function may queue availability requests and the rules 30 may be evaluated at rules engine 26 within rule sets. When evaluating rule 30 within a rule set, if all conditions of rule 30 are "true" but availability requests associated with rule 30 are still queued, then the rules engine 26 may construct a deferred rule 30 containing the original rule 30 and a list of its queued availability requests. After rules engine 26 has evaluated all other rules 30 in the rule set, rules engine 26 evaluates the deferred rule 30. If all availability requests associated with deferred rule 30 result in promises within the specified lead time (return "true"), then the rule 30 embedded in deferred rule 30 is declared "true." This optimization technique helps ensure that less computationally expensive (faster running) conditions within the rule 30 are evaluated before more computationally expensive (slower running) conditions.

The present invention contemplates specifying containers 28, rules 30, and their associated conditions in any appropriate manner. In one embodiment, a graphical user interface (GUI) associated with content server 14 may allow marketing or other suitable personnel, who may lack sophisticated computer programming skills, to readily specify the attributes of users 12 to which a condition pertains, the products, services, or other items to which the condition pertains, the parameters to be evaluated for the condition, the parameter values that availability data must satisfy for the condition to return "true," grouping of the condition with one or more other conditions within a rule 30, the dates for which the condition is applicable, or any other suitable information relating to the condition. In response to the specification of one or more conditions, content server 14 may automatically generate the corresponding rules 30 and insert these rules 30 into the appropriate containers 28 within web pages 26.

Components of content server 14 and availability server 16 may each operate on one or more computer systems at one or more locations. Although content server 14 and availability server 16 are described primarily as separate systems, they may share one or more computer or other resources, for example, in association with the same website or electronic marketplace. Furthermore, although discussed as separate components, web server 22, rendering engine 24, and rules engine 32, or a combination of two or more of these components, may be implemented in whole or in part using a common program, module, application, or other software component.

Although the present invention is described primarily in connection with web pages communicated to users 12 over the Internet, those skilled in the art will readily appreciate that the present invention provides advantages in any environment in which targeted content is delivered to users 12. For example, such environments may include wireline or wireless Internet, wireline or wireless e-mail, interactive television, kiosks, call centers (where call center personnel might rely on computers to interact with users 12), telephone (where on-hold users 12 might receive the targeted content), displays at gasoline pumps, vending machines, cash registers, or other sales locations, or any other suitable environment.

FIG. 3 illustrates an exemplary method of rendering content according to availability data. The method begins at step 100, where user 12 communicates a request for content to the content server 14, in the form of an HTTP request containing the URL for a particular web page 26 or otherwise. At step 102, the web server 22 retrieves the requested web page 26 and, at step 104, rendering engine 24 begins processing the web page 26 to render it for communication to user 12. At step 106, the rendering engine 24 may encounter a container 28 within web page 26 containing one or more rules 30 and, in response, will instruct rules engine 32 to interpret the rules 30 within the container 28 at step 108. Rules engine 32 interprets the rules 30 at step 110, identifying one or more associated conditions, and communicates one or more availability requests corresponding to the conditions to availability server 16 at step 112. Rules engine 32 may interpret one or more rules 30 and may communicate availability requests for one or more conditions serially, simultaneously, or in any other appropriate manner.

Availability server 16 retrieves the requested availability data, perhaps from one or more appropriate suppliers 18, at step 114 and communicates the availability data to rules engine 32 at step 116. At step 118, rules engine 32 applies one or more conditions to the availability data serially, simultaneously, or in any other suitable manner and, at step 120, incorporates content into the web page 26 according to the availability data. Rendering engine 24 continues processing the web page 26 at step 122 to render it for communication to the user 12. If the rendering engine 24 encounters another container 28 at step 124, the method returns to step 108 for interpretation of the associated rules 30. If rendering engine 24 does not encounter another container 28 at step 124, rendering engine 32 completes its processing of web page 26 at step 126 and completely renders web page 26 at step 128 for communication to user 12. At step 130, the web server 22 communicates the web page 26 to user 12, and the method ends.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented system for rendering content according to availability data for at least one item, comprising:
   a server configured to receive a content request from a user in a current interactive session and, in response to the user-supplied content request, to retrieve the user-requested content;
   a rendering engine coupled with the server and configured to identify at least one rule within the user-requested content and concerning the item; and
   a rules engine coupled with the rendering engine and configured to:
   generate at least one availability request corresponding to the rule and concerning the item;
   receive availability data for the item;
   retrieve additional content according to the availability data for the item, the additional content being selected from among one or more stored content elements that concern the item; and
   communicate the additional content concerning the item to the rendering engine for incorporation in the user-requested content;
   the rendering engine further configured to render the user-requested content, including the additional content concerning the item;
   the server further configured to communicate the rendered user-requested content to the user in the current interactive session to satisfy the user-supplied content request.

2. The system of claim 1, wherein the server comprises a web server and the user-supplied content request comprises a Hypertext Transfer Protocol (HTTP) request containing a Uniform Resource Locator (URL) for a particular web page.

3. The system of claim 1, wherein:
   the user-requested content is a particular web page comprising a container that contains the rule; and
   the additional content concerning the item is incorporated into the web page to replace the container.

4. The system of claim 1, wherein the rule comprises one or more conditions concerning the item, the rules engine applying the conditions to the availability data to determine the content element concerning the item to retrieve.

5. The system of claim 1, wherein the rule comprises a function call.

6. The system of claim 1, wherein the availability data is selected from the group consisting of:
   inventory information concerning the item;
   delivery information concerning the item; and
   pricing information concerning the item.

7. The system of claim 1, wherein the availability data comprises dynamic pricing information for the item obtained from multiple suppliers of the item, the server configured to render content concerning the item that reflects the least of these prices in accordance with a promising policy.

8. The system of claim 1, further comprising an availability server configured to receive the availability request from the rules engine, obtain the availability data from one or more suppliers, and communicate the availability data to the rules engine.

9. The system of claim 8, wherein the availability server is further configured to generate a notification in response to a change in availability data for an item, the server configured to select alternative additional content concerning the item in response to the notification.

10. The system of claim 8, wherein the availability server is further configured to generate a notification in response to a change in the availability data for an item to allow personnel associated with the server to adjust a policy with respect to the item.

11. The system of claim 1, wherein the item comprises multiple components and the availability data comprises availability data for one or more components of the item.

12. The system of claim 1, wherein additional content concerning the item comprises information selected from the group consisting of:
    an advertisement;
    a promotion; and
    an item recommendation.

13. The system of claim 1, wherein additional content concerning the item comprises one or more item recommendations, the server configured to determine the most desirable item recommendation according to one or more sorting criteria and to render the additional content according to that determination.

14. The system of claim 13, wherein the sorting criteria are selected from the group consisting of:
   availability for the item to which the recommendation is directed;
   profitability for the item to which the recommendation is directed;
   one or more other performance indicators associated with the item that a seller wishes to optimize; and
   a characteristic of a user to which the recommendation is to be presented.

15. A computer-implemented method of rendering content according to availability data for at least one item, comprising:
   receiving, by a server, a content request from a user in a current interactive session;
   retrieving, by the server, the user-requested content in response to the user-supplied content request;
   identifying, by the server, at least one rule within the user-requested content and concerning the item;
   generating, by the server, at least one availability request that corresponds to the rule and that concerns the item;
   receiving, by the server, availability data for the item;
   retrieving, by the server, additional content according to the availability data for the item, the additional content being selected from among one or more stored content elements that concern the item;
   incorporating, by the server, the additional content into the user-requested content;
   rendering, by the server, rendering the user-requested content, including the additional content concerning the item; and
   communicating, by the server, the rendered user-requested content to the user in the current interactive session to satisfy the user-supplied content request.

16. The method of claim 15, wherein the user-supplied content request received from the user comprises a Hypertext Transfer Protocol (HTTP) request containing a Uniform Resource Locator (URL) for a particular web page.

17. The method of claim 15, wherein:
   the user-requested content is a particular web page comprising a container that contains the rule; and
   the additional content concerning the item is incorporated into the web page to replace the container.

18. The method of claim 15, wherein:
   the rule comprises one or more conditions concerning the item; and
   the method further comprises applying the conditions to the availability data to determine which content concerning the item to retrieve.

19. The method of claim 15, wherein the rule comprises a function call.

20. The method of claim 15, wherein the availability data is selected from the group consisting of:
   inventory information concerning the item;
   delivery information concerning the item; and
   pricing information concerning the item.

21. The method of claim 15, wherein the availability data comprises dynamic pricing information for the item obtained from multiple suppliers of the item and content concerning the item is rendered reflecting the least of these prices in accordance with a promising policy.

22. The method of claim 15, further comprising:
   receiving the availability request;
   obtaining the availability data from one or more suppliers; and
   communicate the availability data for use in rendering the user-requested content.

23. The method of claim 15, further comprising:
   generating a notification in response to a change in availability data for an item; and
   selecting alternative additional content concerning the item in response to the notification.

24. The method of claim 15, further comprising generating a notification in response to a change in availability data for an item to allow personnel to adjust a policy with respect to the item.

25. The method of claim 15, wherein:
   the item comprises multiple components; and
   the availability data comprises availability data for one or more components of the item.

26. The method of claim 15, wherein the retrieved content concerning the item comprises information selected from the group consisting of:
   an advertisement;
   a promotion; and
   an item recommendation.

27. The method of claim 15, wherein the additional content concerning the item comprises one or more item recommendations and the method further comprises determining the most desirable item recommendation according to one or more sorting criteria, the additional content being rendered according to that determination.

28. The method of claim 15, wherein the sorting criteria are selected from the group consisting of:
   availability for the item to which the recommendation is directed;
   profitability for the item to which the recommendation is directed;
   one or more other performance indicators associated with the item that a seller wishes to optimize; and
   a characteristic of a user to which the recommendation is to be presented.

29. Software for rendering content according to availability data for at least one item, the software being embodied in a computer-readable medium and when executed using one or more computers is configured to:
   receive a content request from a user in a current interactive session;
   retrieve the user-requested content in response to the user-supplied content request;
   identify at least one rule within the user-requested content and concerning the item;
   generate at least one availability request that corresponds to the rule and that concerns the item;
   receive availability data for the item;
   retrieve additional content according to the availability data for the item, where the additional content is selected from among one or more stored content elements that concern the item;
   incorporate the additional content concerning the item into the user-requested content;
   render the user-requested content, including the additional content concerning the item; and
   communicate the rendered user-requested content to the user in the current interactive session to satisfy the user-supplied content request.

30. The software of claim 29, wherein:
the user-requested content is a particular web page comprising a container that contains the rule; and
the additional content concerning the item is incorporated into the web page to replace the container.

31. The software of claim 29, wherein:
the rule comprises one or more conditions concerning the item; and
the software is further configured to apply the conditions to the availability data to determine the content element concerning the item to retrieve.

32. The software of claim 29, wherein the rule comprises a function call.

33. The software of claim 29, wherein the availability data is selected from the group consisting of:
inventory information concerning the item;
delivery information concerning the item; and
pricing information concerning the item.

34. The software of claim 29, wherein the availability data comprises dynamic pricing information for the item obtained from multiple suppliers of the item and content concerning the item is rendered reflecting the least of these prices in accordance with a promising policy.

35. The software of claim 29, further configured to:
receive the availability request;
obtain the availability data from one or more suppliers; and
communicate the availability data for use in rendering the user-requested content.

36. The software of claim 35, further configured to:
generate a notification in response to a change in availability data for an item; and
select alternative additional content concerning the item in response to the notification.

37. The software of claim 35, further configured to generate a notification in response to a change in the availability data for an item to allow personnel to adjust a policy with respect to the item.

38. The software of claim 29, wherein the item comprises multiple components and the availability data comprises availability data for one or more components of the item.

39. The software of claim 29, wherein additional content concerning the item comprises information selected from the group consisting of:
an advertisement;
a promotion; and
an item recommendation.

40. The software of claim 29, wherein additional content concerning the item comprises one or more item recommendations and the software is further configured to determine the most desirable item recommendation according to one or more sorting criteria and to render the additional content according to that determination.

41. The software of claim 40, wherein the sorting criteria are selected from the group consisting of:
availability for the item to which the recommendation is directed;
profitability for the item to which the recommendation is directed;
one or more other performance indicators associated with the item that a seller wishes to optimize; and
a characteristic of the user to which the recommendation is to be presented.

42. A computer-implemented system for rendering content according to availability data for at least one item, comprising:
a server comprising means for receiving a content request from a user in a current interactive session and for retrieving the user-requested content in response to the user-supplied content request;
a rendering engine coupled with the server, the rendering engine comprising means for identifying at least one rule within the user-requested content and concerning the item;
a rules engine coupled with the rendering engine, the rules engine comprising means for generating at least one availability request that corresponds to the rule and that concerns the item, receiving availability data for the item, retrieving additional content according to the availability data for the item, where the additional content is selected from among one or more stored content elements that concern the item, and incorporating the additional content concerning the item into the user-requested content;
the rendering engine further comprising means for identifying the rule comprising means for rendering the user-requested content, including the additional content concerning the item; and
the server further comprising means for receiving the user-supplied content request comprising means for communicating the rendered user-requested content to the user in the current interactive session to satisfy the user-supplied content request.

43. The software of claim 29, wherein the server comprises a web server and the user-supplied content request comprises a Hypertext Transfer Protocol (HTTP) request containing a Uniform Resource Locator (URL) for a particular web page.

* * * * *